US011012635B2

(12) United States Patent
Lee et al.

(10) Patent No.: US 11,012,635 B2
(45) Date of Patent: *May 18, 2021

(54) OPTICAL DEVICE INCLUDING PINHOLE ARRAY APERTURE AND RELATED METHODS

(71) Applicant: EAGLE TECHNOLOGY, LLC, Melbourne, FL (US)

(72) Inventors: Susanne M. Lee, Cocoa, FL (US); Fraser R. Dalgleish, Vero Beach, FL (US)

(73) Assignee: EAGLE TECHNOLOGY, LLC, Melbourne, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/876,861

(22) Filed: May 18, 2020

(65) Prior Publication Data

US 2020/0280664 A1 Sep. 3, 2020

Related U.S. Application Data

(63) Continuation of application No. 16/259,398, filed on Jan. 28, 2019, now Pat. No. 10,701,280.

(51) Int. Cl.
*H04N 5/238* (2006.01)
*H04N 5/225* (2006.01)
*H04N 5/247* (2006.01)
*G02B 26/08* (2006.01)

(52) U.S. Cl.
CPC ......... *H04N 5/238* (2013.01); *G02B 26/0833* (2013.01); *H04N 5/2254* (2013.01); *H04N 5/247* (2013.01)

(58) Field of Classification Search
None
See application file for complete search history.

(56) References Cited

U.S. PATENT DOCUMENTS

| 4,360,797 | A | 11/1982 | Fenimore et al. |
| 8,553,117 | B2 | 10/2013 | Cooper |
| 10,270,947 | B2 * | 4/2019 | Melakari ............ G02B 3/0056 |

(Continued)

OTHER PUBLICATIONS

Newman et al.; "Pinhole Array Camera for Integrated Circuits;" Applied Optics; Jul. 1966; vol. 5, No. 7; pp. 1225-1228. See Priority U.S. Appl. No. 16/259,398, filed Jan. 28, 2019.

(Continued)

*Primary Examiner* — Cynthia Segura
(74) *Attorney, Agent, or Firm* — Allen, Dyer, Doppelt + Gilchrist, P.A. Attorneys at Law

(57) ABSTRACT

An optical device may include a pinhole array layer having pinhole array apertures therein. The pinhole array layer may have a first side to be directed toward incoming electromagnetic (E/M) radiation, and a second side opposite the first side. The optical device may also include image sensors. Each image sensor may include image sensing pixels adjacent the second side of the pinhole array layer. The optical device may also include mirrors. Each mirror may be associated with a respective image sensor and respective pinhole array aperture defining a camera. Each mirror may reflect incoming E/M radiation passing through the respective pinhole array aperture to the respective image sensor. A respective baffle may be between adjacent cameras.

23 Claims, 5 Drawing Sheets

(56) References Cited

U.S. PATENT DOCUMENTS

| | | | |
|---|---|---|---|
| 10,303,919 | B2 | 5/2019 | Mienko et al. |
| 10,360,431 | B2 | 7/2019 | Gozzini et al. |
| 10,701,280 | B1 * | 6/2020 | Lee .................. H04N 5/238 |
| 2010/0277805 | A1 | 11/2010 | Schilling et al. |
| 2011/0026141 | A1 | 2/2011 | Barrows |
| 2012/0273695 | A1 | 11/2012 | Boettiger |
| 2013/0051635 | A1 | 2/2013 | Wu et al. |
| 2013/0119237 | A1 | 5/2013 | Raguin et al. |
| 2015/0371074 | A1 | 12/2015 | Lin |
| 2016/0027829 | A1 | 1/2016 | Wu et al. |
| 2016/0191774 | A1 * | 6/2016 | Zhou .................. G03B 41/00 348/262 |
| 2017/0161540 | A1 * | 6/2017 | Mienko .............. G06K 9/00073 |
| 2017/0180687 | A1 * | 6/2017 | Wang ................ G02B 5/201 |
| 2018/0035036 | A1 | 2/2018 | Ahn et al. |
| 2018/0152582 | A1 * | 5/2018 | Murase ............... H04N 1/1135 |
| 2020/0057310 | A1 * | 2/2020 | Wippermann ....... H04N 5/2254 |

OTHER PUBLICATIONS

Xie et al.; "Depth-tunable three-dimensional display with interactive light field control," Optics Communications; vol. 371; 2016; pp. 166-172. See Priority U.S. Appl. No. 16/259,398, filed Jan. 28, 2019.

\* cited by examiner

OPTICAL DEVICE INCLUDING PINHOLE ARRAY APERTURE AND RELATED METHODS

TECHNICAL FIELD

The present invention relates to the field of optical devices, and more particularly, to optical image sensing and related methods.

BACKGROUND

A telescope is one device for acquiring images. A telescope may be terrestrial based or space based. A telescope may include an image sensor, for example, an optical image sensor, which in conjunction with one or more lenses, is typically used to sense desired images from incoming electromagnetic (E/M) radiation. The lenses may direct light or E/M radiation to the image sensor where image processing may occur.

To achieve desired image resolution and/or magnification, a telescope may include relatively large optics, for example, lenses or arrays of lenses and relatively large housings or support structures. Precision thermal control may also be desired with such telescopes. Relatively large optics and support structures along with thermal controls may be undesirable for certain applications.

SUMMARY

An optical device may include a pinhole array layer having a plurality of pinhole array apertures therein. The pinhole array layer may have a first side to be directed toward incoming electromagnetic (E/M) radiation, and a second side opposite the first side. The optical device may also include a plurality of image sensors. Each image sensor may include a plurality of image sensing pixels adjacent to the second side of the pinhole array layer. The optical device may also include a plurality of mirrors, and each mirror may be associated with a respective image sensor and respective pinhole array aperture defining a camera. Each mirror may reflect incoming E/M radiation passing through the respective pinhole array aperture to the respective image sensor. A respective opaque baffle may be between adjacent cameras.

Each pinhole array aperture may have a controllable size. The optical device may also include a controller coupled to the pinhole array layer to control a size of at least one pinhole array aperture.

The pinhole array layer may include a plurality of piezoelectric material layers in stacked relation, for example. At least one mirror may have a controllable shape. The optical device may also include a controller coupled to each the at least one mirror to control a shape thereof. The at least one mirror may include a deformable micro mirror, for example.

Each image sensor may include an integrated circuit image sensor. The optical device may further include a respective spiral phase plate aligned with each pinhole array aperture, for example.

The optical device may further include image processing circuitry coupled to the plurality of image sensors and configured to generate an image from the incoming E/M radiation. Each image sensing pixel may be responsive to at least one of visible light, ultraviolet (UV) light, and near infrared (NIR) light, for example.

A method aspect is directed to a method of making an optical device. The method may include coupling a plurality of image sensors adjacent to a pinhole array layer having a plurality of pinhole array apertures therein so that each of the plurality of image sensors is aligned with a respective pinhole array aperture. The method may also include mounting a plurality of mirrors so that each mirror is associated with a respective image sensor and respective pinhole array aperture defining a camera and so that each mirror reflects incoming E/M radiation passing through the respective pinhole array aperture to the respective image sensor.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
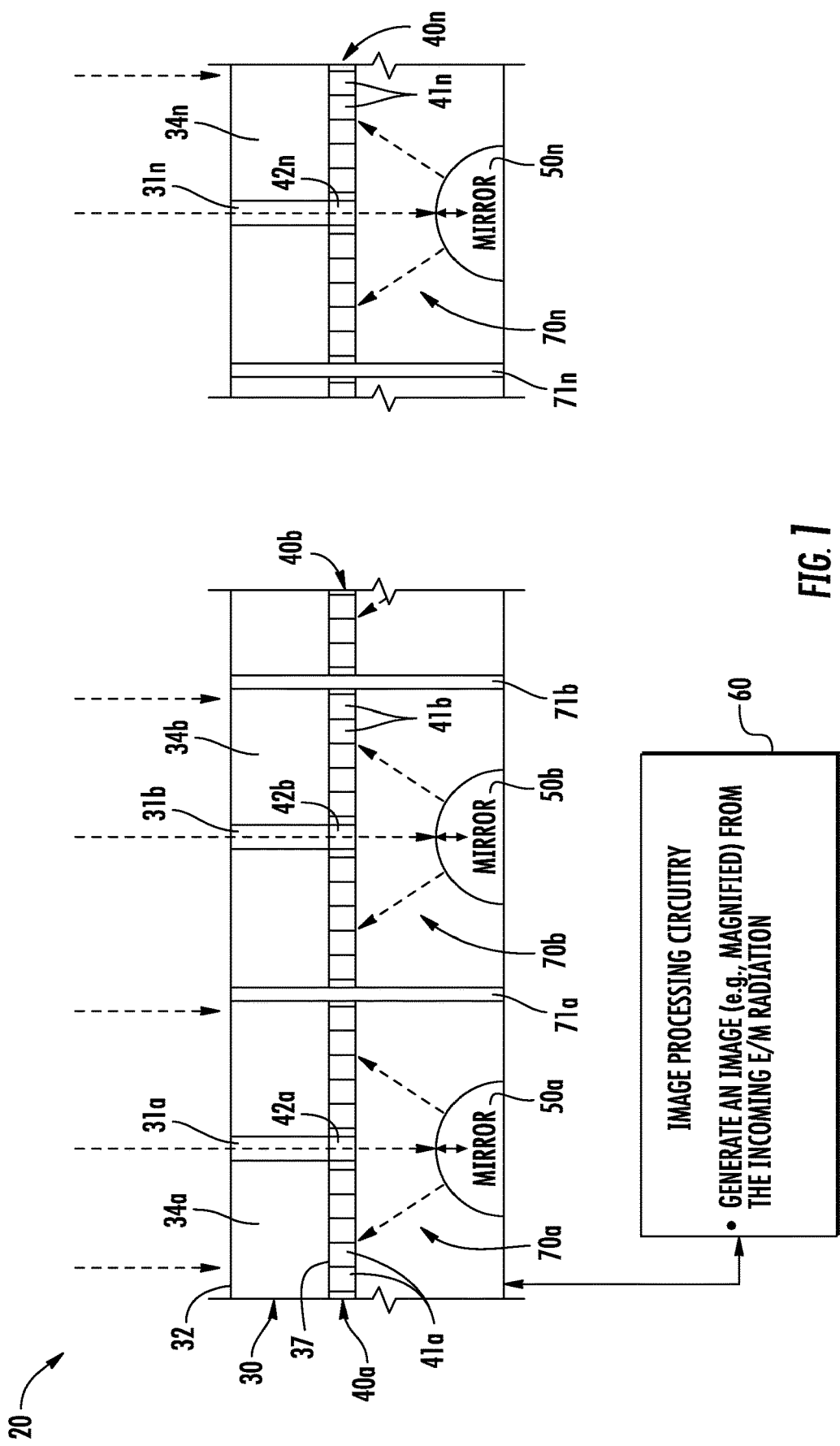
FIG. 1 is a schematic diagram of an optical device in accordance with an embodiment.
Figure 2:
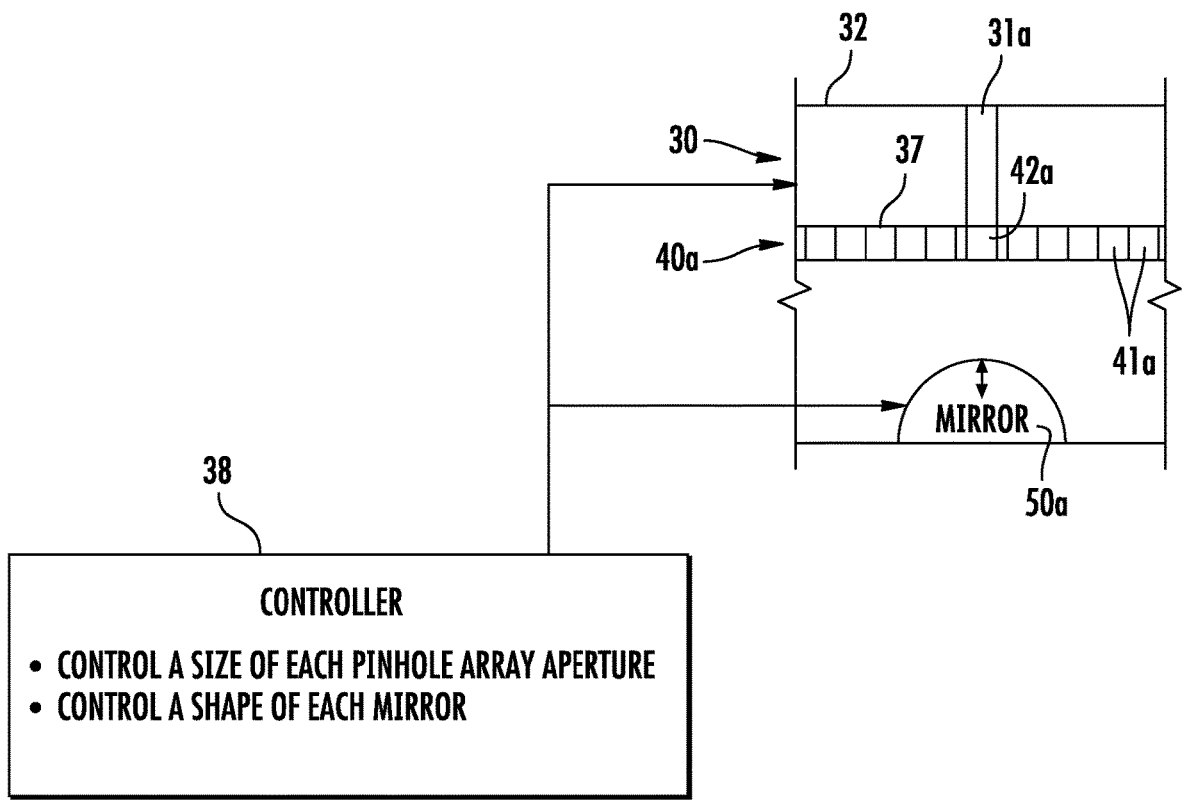
FIG. 2 is another schematic diagram of an optical device in accordance with an embodiment.

Referring initially to FIGS. 1-2, an optical device 20, which may be in the form of a telescope, includes a pinhole array layer 30. The pinhole array layer 30 has pinhole array apertures 31a-31n therein. Each of the pinhole array apertures 31a-31n may have a size in a range of 5-50 microns, for example. Those skilled in the art will appreciate that the size of each pinhole array aperture 31a-31n corresponds to image resolution. For example, the smaller the size of the pinhole array apertures 31a-31n, the higher the image resolution. The pinhole array layer 30 has a first side 32 to be directed toward incoming electromagnetic (E/M) radiation, and a second side 37 opposite the first side.

Figure 3:
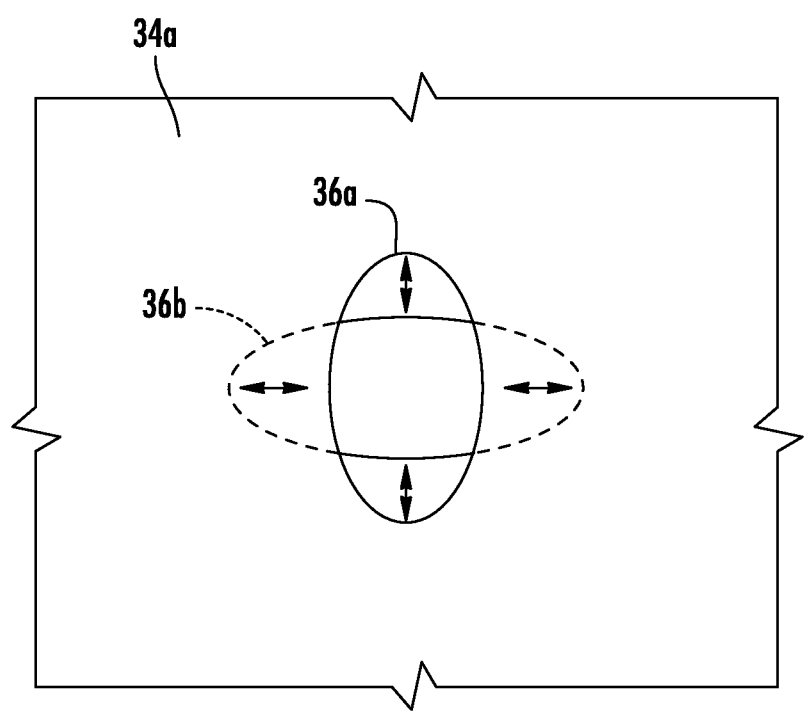
FIG. 3 is an enlarged schematic top view of a pinhole array layer in accordance with an embodiment.
Figure 4:
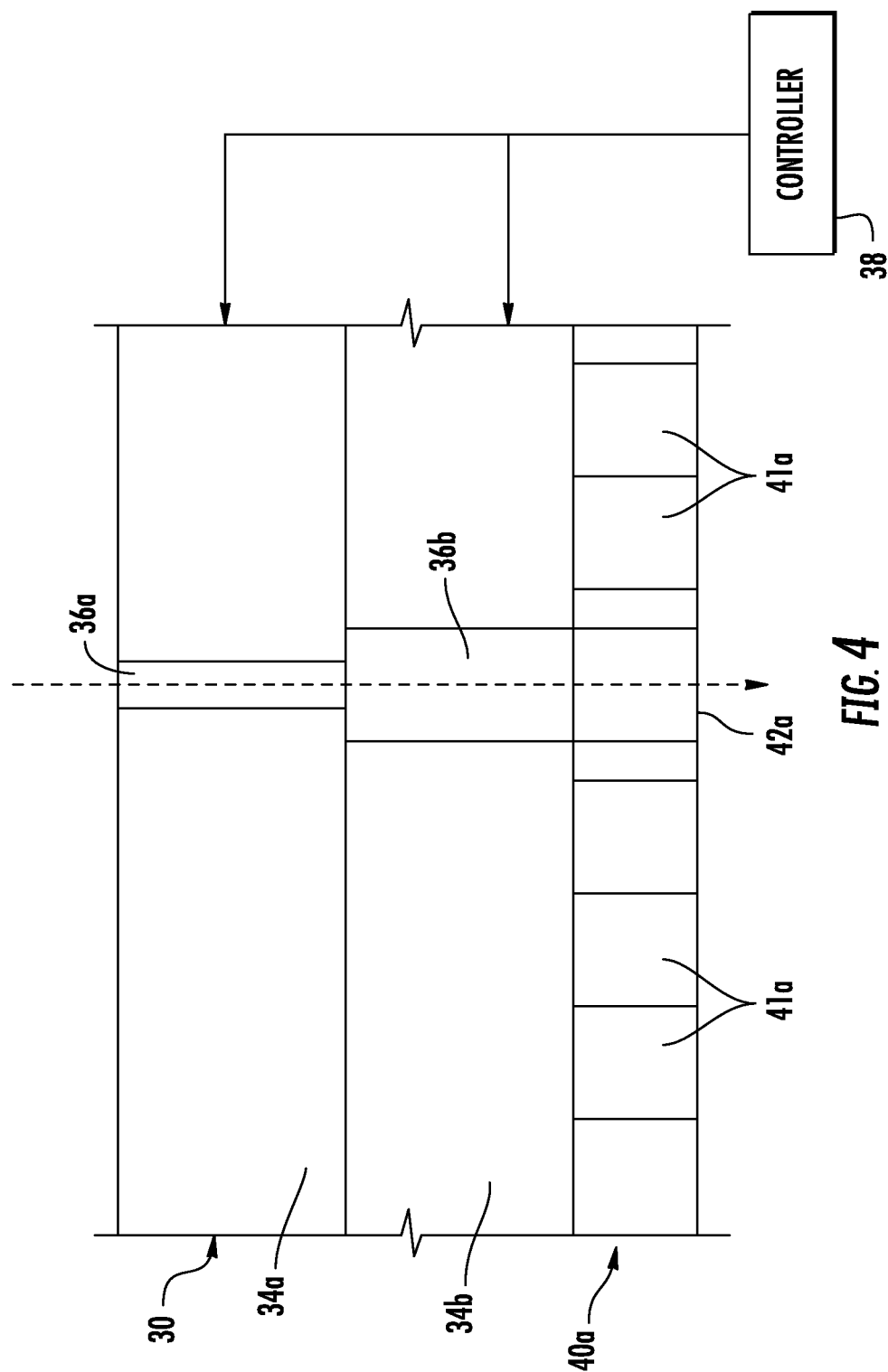
FIG. 4 is an enlarged schematic side view of a portion of an optical device including the pinhole array layer of FIG. 3.

Referring additionally to FIGS. 3 and 4, each pinhole array aperture 31a-31n may have a controllable size, for example, electrically as described below, or mechanically by applying a pressure or stress/strain. More particularly, the pinhole array layer 30 may include piezoelectric material layers 34a, 34b in stacked relation, and each having their own respective pinhole apertures 36a, 36b. A controller 38 coupled to pinhole array layer 30 (FIG. 2), or more particularly, the piezoelectric material layers 36a, 36b (FIG. 4), controls the size of each pinhole array aperture 31a-31n. Application of a voltage to piezoelectric material layers 34a, 34b by way of the controller 38 causes a change in the size of the pinhole array apertures 31a-31n (FIG. 2), 36a, 36b (FIGS. 3 and 4). The controller 38 may change the aperture sizes based upon environmental input and/or a desired resolution, as will be appreciated by those skilled in the art. While two piezoelectric material layers 34a, 34b are illustrated, there may be any number of piezoelectric layers. The piezoelectric material layers 34a, 34b may be arranged so that the pinhole array apertures 31a-31n (FIG. 2), 36a, 36b (FIG. 4), which may each have an oblong shape, of a given piezoelectric material layer are transverse to the pinhole array apertures in an adjacent piezoelectric material layer, which may result in an effective pinhole array aperture that is nearly round in shape. The piezoelectric materials of the piezoelectric material layers 34a, 34b may shape the ray bundles (i.e., light) that exit each effective pinhole array aperture 31a-31n with a spatial profile that may be more circular than the oblong shape of each of the pinhole array apertures 31a-31n, for example. In some embodiments, one, more than one, or all of the pinhole array apertures 31a-31n may not be controllable or have an adjustable size.

The optical device 20 also includes image sensors 40a-40n. Each image sensor 40a-40n may be an integrated circuit image sensor, for example, a complementary metal oxide semiconductor (CMOS) image sensor.

Each image sensor 40a-40n includes image sensing pixels 41a-41n adjacent the second side 37 of the pinhole array layer 30. Each image sensing pixel 41a-41n may be responsive to at least one of visible light, ultraviolet (UV) light, and near infrared (NIR) light, for example. For example, the image sensors 40a-40n may each have 12 megapixels and include a filter for color (e.g., a Bayer filter). In some embodiments, each image sensor 40a-40n may include a polarizing filter. A given polarizing filter may have a same polarization as an adjacent polarizing filter. Of course, a given polarizing filter may have a different polarization as an adjacent polarizing filter. As will be appreciated by those skilled in the art, the polarization filters may be incorporated into the image sensors 40a-40n at a pixel level.

Each image sensor 40a-40n may also have an image sensor aperture 42a-42n therein (e.g. through a non-active area) and aligned with a respective pinhole array aperture 31a-31n. In some embodiments, each image sensor 40a-40n may not include an image sensor aperture 42a-42n. For example, each image sensor 40a-40n may be positioned or tiled around the pinhole array apertures 31a-31n.

The optical device 20 also includes mirrors 50a-50n. The mirrors 50a-50n may be mounted on a substrate, for example, about 10 cm from respective image sensors 40a-40n. Each mirror 50a-50n is associated with a respective image sensor 40a-40n and aligned with a respective pinhole array aperture 31a-31n to reflect incoming E/M radiation passing through the respective pinhole array aperture and image sensor aperture 42a-42n to the respective image sensor.

Each mirror 50a-50n may have a controllable shape, for example, the curvature of the mirror (e.g., radius) may be changeable or controllable. The shape of each mirror 50a-50n may be controlled electrically or mechanically, as will be appreciated by those skilled in the art. More particularly, the controller 38 may also be coupled to each mirror 50a-50n and control the shape thereof. While a single controller 38 is described as controlling the shape of each mirror 50a-50n and the size of each pinhole array aperture 31a-31n, there may be more than one controller performing respective functions (e.g., individual control circuitry). Each mirror 50a-50n may include or be in the form of a deformable micro mirror or a liquid crystal film mirror. Of course, the mirrors 50a-50n may include additional and/or different types of mirrors, for example, an electrostatic actuator, a piezo-deformable micro-mirror, and/or a liquid lens with a reflective (e.g., silvered) surface. In some embodiments, one, more than one, or all of the mirrors 50a-50n may not be controllable or have an adjustable shape.

Each mirror 50a-50n and associated image sensor 40a-40n and pinhole array aperture 31a-31n defines a camera 70a-70n. A respective opaque baffle 71a-71n is between adjacent cameras 70a-70n. The opaque baffles 71a-71n reduce or block E/M radiation (e.g., undesirable scattered E/M radiation) to increase, for example, maximize, the signal to noise ratio on the image sensors 40a-40n (i.e., reduce cross-talk between image sensors).

During operation, E/M light passes through each pinhole array aperture 31a-31n to a respective mirror 50a-50n. The E/M light is reflected from each mirror upwardly to the second side 37 of the pinhole array layer 30 and is received by the corresponding image sensing pixels 41a-41n. The light passes through from outside the optical image device 20 to the image sensors 40a-40n without going through a lens. Moreover, a baffle 71a-71n between each of the single pinhole array apertures 31a-31n and its corresponding mirror 50a-50n and image sensor 40a-40n may result in little or no light bleeding between adjacent cameras 70a-70n. However, those skilled in the art will appreciate that, based upon changing of the pinhole array aperture sizes and mirror shapes, the field of view (and thus resolution) and the radius of curvature (and thus magnification) may change, respectively. The 1-to-1 correspondence of image sensors 40a-40n to pinhole array apertures 31a-31n may be particularly advantageous for generating increased resolution sensed images, for example, based upon computational processing.

Image processing circuitry 60 is coupled to the image sensors 40a-40n. The image processing circuitry 60 generates a composite image from the incoming E/M radiation. More particularly, where the optical device 20 is in the form of a telescope, the image processing circuitry 60 generates a magnified composite image from the incoming E/M radiation. Of course, the optical device 20 may be implemented as or within another type of device, for example, a terrestrial camera.

For example, the image processing circuitry 60 may control the electronic spatial integrations at each or multiple image sensors 40a-40n (e.g., simultaneously) to achieve electronic magnification to generate denser or sparser imagery from the incoming E/M radiation. Alternatively, or additionally, optical magnification may be achieved by changing the radius of curvature of the mirrors 50a-50n.

In an embodiment, the photon sensitivity of each of the image sensors 40a-40n may be adjustable, for example, on a per-pixel basis. The photon sensitivity of each image sensor 40a-40n may be adjusted on a per camera basis. The photon sensitivity of a given image sensor 40a-40n may be adjusted differently than other image sensors. The ability to adjust the photon sensitivity may improve resolution and signal-to-noise within a scene, for example, for use in computational imaging algorithms, as will be appreciated by those skilled in the art.

In some embodiments, with respect to operation of the optical device 20, one or more of the image sensors 40a-40n may be operated in a binned mode with macro pixels (i.e., not native pixel resolution) to increase, for example, the signal level at each macro pixel. This may enable adjustable resolution with increased signal-to-noise ratio. In an embodiment, the size of the pinhole array apertures 31a-31n may be varied to adjust image resolution and signal-to-noise ratio. In another embodiment, all the image sensing pixels 41a-41n associated with a single image sensor 40a-40n may be binned into a single image sensing pixel. By binning the image sensing pixels 41a-41n into a single image sensing pixel, imaging with all the cameras 70a-70n (i.e., the whole array) may provide the pixelated image with each camera contributing to the image intensity for each image sensing pixel in the image. This may enable imaging of relatively large areas at relatively long or extreme distances, for example, at or greater than 1000 km.

Figure 5:
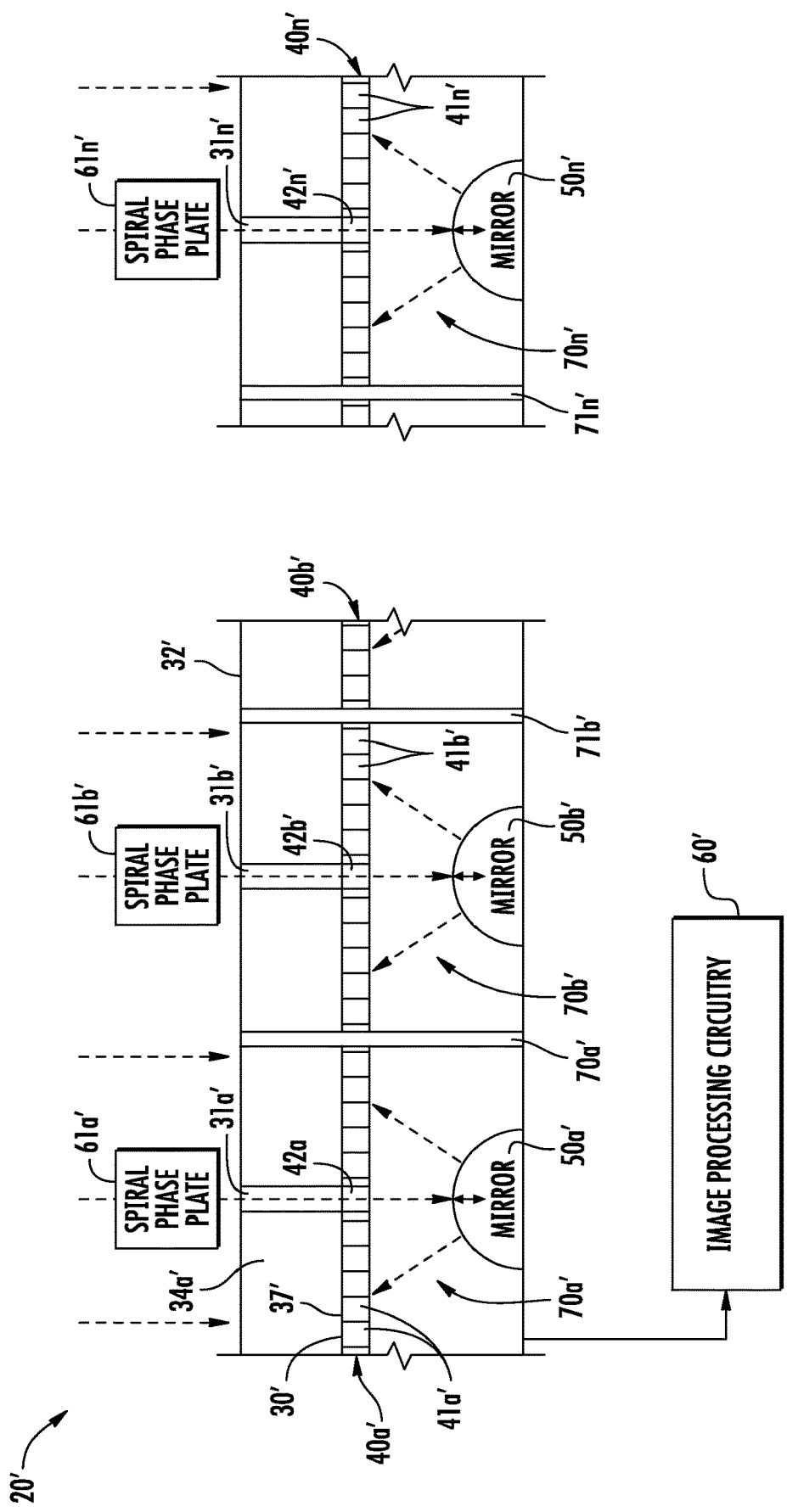
FIG. 5 is a schematic diagram of an optical device in accordance with another embodiment.

Referring now briefly to FIG. 5, in an embodiment, the optical device 20' may include a respective phase plate 61a'-61n' adjacent or aligned at the entry of each pinhole array aperture 31a'-31n'. The phase plates 61a'-61n', for example, the type of phase plates, may be used based upon the desired implementation (e.g., desired sensed light characteristics) of the optical device 20'. For example, the phase plates 61a'-61n' may have a spiral shape. As will be appreciated by those skilled in the art, when incoming E/M radiation of interest, has orbital angular momentum (OAM), the spiral phase plates 61a'-61n' at the entry of each camera 70a'-70n' may be used to spatially reject the non-OAM light at the detector focal plane since such light is not spatially coherent with the spiral phase patterns of the incoming E/M radiation of interest. Elements illustrated with respect to the present embodiment, but not specifically described are similar to those described above with respect to FIGS. 1-4.

As a telescope, the optical device 20 may advantageously monitor satellites for space situational awareness. The optical device 20 may provide a relatively low size, weight, power and cooling alternative to other types of optical telescopes, for example, 3-5 meter diameter telescopes, which include relatively large optics, relatively large supporting structures, and increased or relatively high precision thermal controls. Indeed, the optical device 20 may provide increased resolution, compressed data resulting in relatively fast and secure data transfer, and infinite depth of field, while maintaining a manageable bandwidth. In other words, the optical device 20 may exploit the sparsity of a scene to achieve an improved compression ratio (at the image formation stage) to maintain the manageable bandwidth.

A method aspect is directed to a method of making an optical device 20. The method includes coupling image sensors 40a-40n adjacent a pinhole array layer 30 having pinhole array apertures 31a-31n therein so that an image sensor aperture 42a-42n of each of the image sensors is aligned with a respective pinhole array aperture. The method also includes mounting mirrors 50a-50n so that each mirror is associated with a respective image sensor 40a-40n defining a camera 70a-70n and aligned with a respective pinhole array aperture 31a-31n to reflect incoming E/M radiation passing through the respective pinhole array aperture toward the respective image sensor.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An optical device comprising:
a pinhole array layer having a plurality of pinhole array apertures therein, the pinhole array layer having a first side to be directed toward incoming electromagnetic (E/M) radiation, and a second side opposite the first side;
a plurality of image sensors adjacent the second side of the pinhole array layer; and
a plurality of mirrors, each mirror associated with a respective image sensor and respective pinhole array aperture defining a camera, and each mirror to reflect incoming E/M radiation passing through the respective pinhole array aperture to the respective image sensor.

2. The optical device of claim 1 wherein each pinhole array aperture has a controllable size.

3. The optical device of claim 2 comprising a controller coupled to the pinhole array layer to control a size of at least one pinhole array aperture.

4. The optical device of claim 2 wherein the pinhole array layer comprises a plurality of piezoelectric material layers in stacked relation.

5. The optical device of claim 1 wherein at least one mirror has a controllable shape.

6. The optical device of claim 5 comprising a controller coupled to the at least one mirror to control a shape thereof.

7. The optical device of claim 5 wherein the at least one mirror comprises a deformable micro mirror.

8. The optical device of claim 1 wherein each image sensor comprises an integrated circuit image sensor.

9. The optical device of claim 1 comprising a respective spiral phase plate aligned with each pinhole array aperture.

10. The optical device of claim 1 comprising image processing circuitry coupled to the plurality of image sensors and configured to generate an image from the incoming E/M radiation.

11. The optical device of claim 1 wherein each image sensor is responsive to at least one of visible light, ultraviolet (UV) light, and near infrared (NIR) light.

12. A space telescope device comprising:
a pinhole array layer having a diameter of at least three meters and a plurality of pinhole array apertures therein, the pinhole array layer having a first side to be directed toward incoming electromagnetic (E/M) radiation from space, and a second side opposite the first side;
a plurality of image sensors adjacent the second side of the pinhole array layer; and
a plurality of mirrors, each mirror associated with a respective image sensor and respective pinhole array aperture defining a camera, and each mirror to reflect incoming E/M radiation from space passing through the respective pinhole array aperture to the respective image sensor.

13. The space telescope of claim 12 wherein each pinhole array aperture has a controllable size.

14. The space telescope of claim 13 comprising a controller coupled to the pinhole array layer to control a size of at least one pinhole array aperture.

15. The space telescope of claim 13 wherein the pinhole array layer comprises a plurality of piezoelectric material layers in stacked relation.

16. The space telescope of claim 12 wherein at least one mirror has a controllable shape.

17. The space telescope of claim 12 wherein each image sensor comprises an integrated circuit image sensor.

18. The space telescope of claim 12 further comprising a respective spiral phase plate aligned with each pinhole array aperture.

19. A method of making an optical device comprising:
mounting a plurality of image sensors adjacent a pinhole array layer having a plurality of pinhole array apertures therein; and
mounting a plurality of mirrors so that each mirror is associated with a respective image sensor and respective pinhole array aperture defining a camera and so that each mirror reflects incoming E/M radiation passing through the respective pinhole array aperture to the respective image sensor.

20. The method of claim 19 wherein at least one pinhole array aperture has a controllable size, and comprising coupling a controller to the pinhole array layer.

21. The method of claim 20 wherein the pinhole array layer comprises a plurality of piezoelectric material layers in stacked relation.

22. The method of claim 19 wherein at least one mirror has a controllable shape, and comprising coupling a controller to that at least one mirror.

23. The method of claim 22 wherein the at least one mirror comprises a deformable micro mirror.

* * * * *